United States Patent
Tanaka

(10) Patent No.: US 12,528,461 B2
(45) Date of Patent: Jan. 20, 2026

(54) VEHICLE BLIND SPOT RISK ESTIMATION CONTROL METHOD, VEHICLE CONTROLLER, AND NON-TRANSITORY COMPUTER-READABLE STORAGE MEDIUM STORING VEHICLE CONTROL PROGRAM

(71) Applicant: TOYOTA JIDOSHA KABUSHIKI KAISHA, Toyota (JP)

(72) Inventor: Shin Tanaka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 282 days.

(21) Appl. No.: 18/212,734

(22) Filed: Jun. 22, 2023

(65) Prior Publication Data

US 2024/0025398 A1    Jan. 25, 2024

(30) Foreign Application Priority Data

Jul. 22, 2022    (JP) .................................. 2022-117165

(51) Int. Cl.
*B60W 30/095*    (2012.01)
*B60W 40/04*    (2006.01)

(52) U.S. Cl.
CPC ........ *B60W 30/0956* (2013.01); *B60W 40/04* (2013.01); *B60W 2554/402* (2020.02); *B60W 2554/4042* (2020.02); *B60W 2554/4046* (2020.02); *B60W 2554/801* (2020.02)

(58) Field of Classification Search
CPC ............. B60W 30/0956; B60W 40/04; B60W 2554/402; B60W 2554/4042; B60W 2554/4046; B60W 2554/801

USPC .......................................................... 701/26
See application file for complete search history.

(56) References Cited

U.S. PATENT DOCUMENTS

| | | | |
|---|---|---|---|
| 9,969,261 | B2 | 5/2018 | Kodama |
| 10,045,173 | B1 | 8/2018 | Morimura et al. |
| 10,106,157 | B2 | 10/2018 | Sawada et al. |
| 10,150,407 | B2 | 12/2018 | Takahashi et al. |
| 10,696,297 | B2 | 6/2020 | Nguyen Van et al. |
| 11,001,255 | B2 | 5/2021 | Fukuman et al. |

(Continued)

FOREIGN PATENT DOCUMENTS

| | | | | |
|---|---|---|---|---|
| DE | 102022201407 B3 | * | 8/2023 | ............ G06V 20/56 |
| EP | 3028266 B1 | * | 9/2017 | ............ B60W 30/08 |

(Continued)

OTHER PUBLICATIONS

Machine translation of JP-2012192878-A (Year: 2012).*

*Primary Examiner* — Kenneth M Dunne
(74) *Attorney, Agent, or Firm* — Dinsmore & Shohl LLP

(57) ABSTRACT

According to the method of the present disclosure, first, a blind spot that is present in front of an ego-vehicle and cannot be seen from the ego-vehicle is recognized from information on a surrounding environment of the ego-vehicle. Next, a traveling behavior of a blind spot passing vehicle in the vicinity of the blind spot is observed from information acquired by an external sensor of the ego-vehicle. The blind spot passing vehicle is a vehicle that passes through the blind spot before the ego-vehicle. Then, a risk caused by the blind spot is estimated based on the traveling behavior of the blind spot passing vehicle. Finally, the ego-vehicle is operated in a mode corresponding to the risk.

4 Claims, 6 Drawing Sheets

(56) References Cited

U.S. PATENT DOCUMENTS

| | | |
|---|---|---|
| 11,110,937 B2 | 9/2021 | Kinoshita et al. |
| 2012/0059789 A1* | 3/2012 | Sakai ..................... G08G 1/166 |
| | | 706/52 |
| 2016/0233764 A1 | 8/2016 | Park et al. |
| 2017/0323568 A1* | 11/2017 | Inoue ..................... G08G 1/163 |
| 2018/0370526 A1* | 12/2018 | Ohmura ............... G06V 20/584 |
| 2019/0001968 A1 | 1/2019 | Yorifuji et al. |
| 2019/0344828 A1 | 11/2019 | Omori et al. |
| 2019/0389488 A1 | 12/2019 | Yamada et al. |
| 2023/0147874 A1* | 5/2023 | Govardhanam ....... G05D 1/617 |
| | | 701/26 |
| 2023/0311866 A1* | 10/2023 | Ishikawa ........... B60W 30/0956 |

FOREIGN PATENT DOCUMENTS

| | | | |
|---|---|---|---|
| JP | 2012192878 A * | 10/2012 | |
| JP | 5573617 B2 * | 8/2014 | |
| JP | 2018-509795 A | 4/2018 | |
| JP | 2020-190969 A | 11/2020 | |
| WO | WO-2018158911 A1 * | 9/2018 | ............ B60W 30/08 |
| WO | WO-2019078010 A1 * | 4/2019 | .......... B60W 30/095 |

\* cited by examiner

VEHICLE BLIND SPOT RISK ESTIMATION CONTROL METHOD, VEHICLE CONTROLLER, AND NON-TRANSITORY COMPUTER-READABLE STORAGE MEDIUM STORING VEHICLE CONTROL PROGRAM

CROSS-REFERENCE TO RELATED APPLICATION

The present application claims priority under 35 U.S.C. § 119 to Japanese Patent Application No. 2022-117165, filed Jul. 22, 2022, the contents of which application are incorporated herein by reference in their entirety.

BACKGROUND

Field

The present disclosure relates to a vehicle control method, a vehicle controller, and a vehicle control program for coping with a potential risk existing ahead of an ego-vehicle.

Background Art

There is known a technique in which an ego-vehicle acquires information recognized by a peripheral vehicle through communication. For example, JP2018-509705 A discloses that information related to a potential risk identified by a preceding vehicle is transmitted to a following vehicle. JP2020-190969A discloses sharing information related to an obstacle that cannot be directly detected from an ego-vehicle by communicating with a preceding vehicle ahead of a blind corner.

SUMMARY

However, each of the above techniques cannot be used unless the preceding vehicle is equipped with a system for recognizing the risk. Further, when there is no means for communication between the preceding vehicle and the ego-vehicle, the ego-vehicle cannot acquire risk information from the preceding vehicle.

The present disclosure has been made in view of the above problem, and an object of the present disclosure is to provide a technique capable of coping with a risk potentially existing in front of an ego-vehicle without depending on provision of risk information through communication with the outside.

In order to achieve the above object, the present disclosure provides a vehicle control method executed by an in-vehicle computer. The vehicle control method of the present disclosure comprises the following first to fourth steps. The first step is a step of recognizing a blind spot that is present in front of an ego-vehicle and cannot be seen from the ego-vehicle from information on a surrounding environment of the ego-vehicle. The second step is a step of observing, from information acquired by an external sensor of the ego-vehicle, a traveling behavior of a blind spot passing vehicle in the vicinity of the blind spot, the blind spot passing vehicle being a vehicle that passes through the blind spot before the ego-vehicle. The third step is a step of estimating a risk caused by the blind spot based on the traveling behavior of the blind spot passing vehicle. The fourth step is a step of operating the ego-vehicle in a mode corresponding to the risk.

Also, in order to achieve the above object, the present disclosure provides a vehicle controller. The vehicle controller of the present disclosure comprises a program memory and a processor coupled to the program memory. The program memory stores a plurality of executable instructions. The plurality of executable instructions is configured to cause the processor to execute the following first to fourth processes. The first process is a process of recognizing a blind spot that is present in front of an ego-vehicle and cannot be seen from the ego-vehicle from information on a surrounding environment of the ego-vehicle. The second process is a process of observing, from information acquired by an external sensor of the ego-vehicle, a traveling behavior of a blind spot passing vehicle in the vicinity of the blind spot, the blind spot passing vehicle being a vehicle that passes through the blind spot before the ego-vehicle. The third process is a process of estimating a risk caused by the blind spot based on the traveling behavior of the blind spot passing vehicle. The fourth process is a process of operating the ego-vehicle in a mode corresponding to the risk.

Further, in order to achieve the above object, the present disclosure provides a vehicle control program. The vehicle control program of the present disclosure is configured to cause an in-vehicle computer to execute the above-described first to fourth processes. The vehicle control program of the present disclosure may be recorded in a non-transitory computer-readable storage medium.

The above-described technique of the present disclosure makes it possible to estimate the risk caused by the blind spot from the traveling behavior of the blind spot passing vehicle obtained by the external sensor of the ego-vehicle, and to operate the ego-vehicle in the mode corresponding to the estimated risk. Accordingly, dealing with the risk potentially existing in front of the ego-vehicle is achieved without depending on provision of risk information through communication with the outside.

The observing the traveling behavior of the blind spot passing vehicle may comprise measuring a passing speed and a lateral position offset of the blind spot passing vehicle in the vicinity of the blind spot. The estimating the risk may comprises: calculating a threshold speed from the lateral position offset; and estimating that the risk is low when the passing speed is higher than the threshold speed, and the risk is high when the passing speed is equal to or lower than the threshold speed. If the passing speed of the blind spot passing vehicle is constant, it can be estimated that the larger the lateral position offset is, the higher the risk recognized by the blind spot passing vehicle is. Further, if the lateral position offset of the blind spot passing vehicle is constant, it can be estimated that the blind spot passing vehicle recognizes a higher risk as the passing speed is lower. Therefore, comparing the threshold speed calculated from the lateral position offset with the passing speed provides a plausible estimate of the degree of the risk.

Further, the estimating the risk may comprise: estimating a type of a moving object that is likely to jump out of the blind spot from the information on the surrounding environment; and changing the calculation of the threshold speed depending on the type of the moving object. The risk for the ego-vehicle varies depending on what moving object is coming out of the blind spot. By reflecting the estimated type of the moving object in the calculation of the threshold speed, the ego-vehicle can more accurately respond to the risk potentially existing ahead of the ego-vehicle.

As described above, according to the technique of the present disclosure, it is possible to deal with the risk potentially existing in front of the ego-vehicle without depending on provision of risk information through communication with the outside.

DETAILED DESCRIPTION

Figure 1:
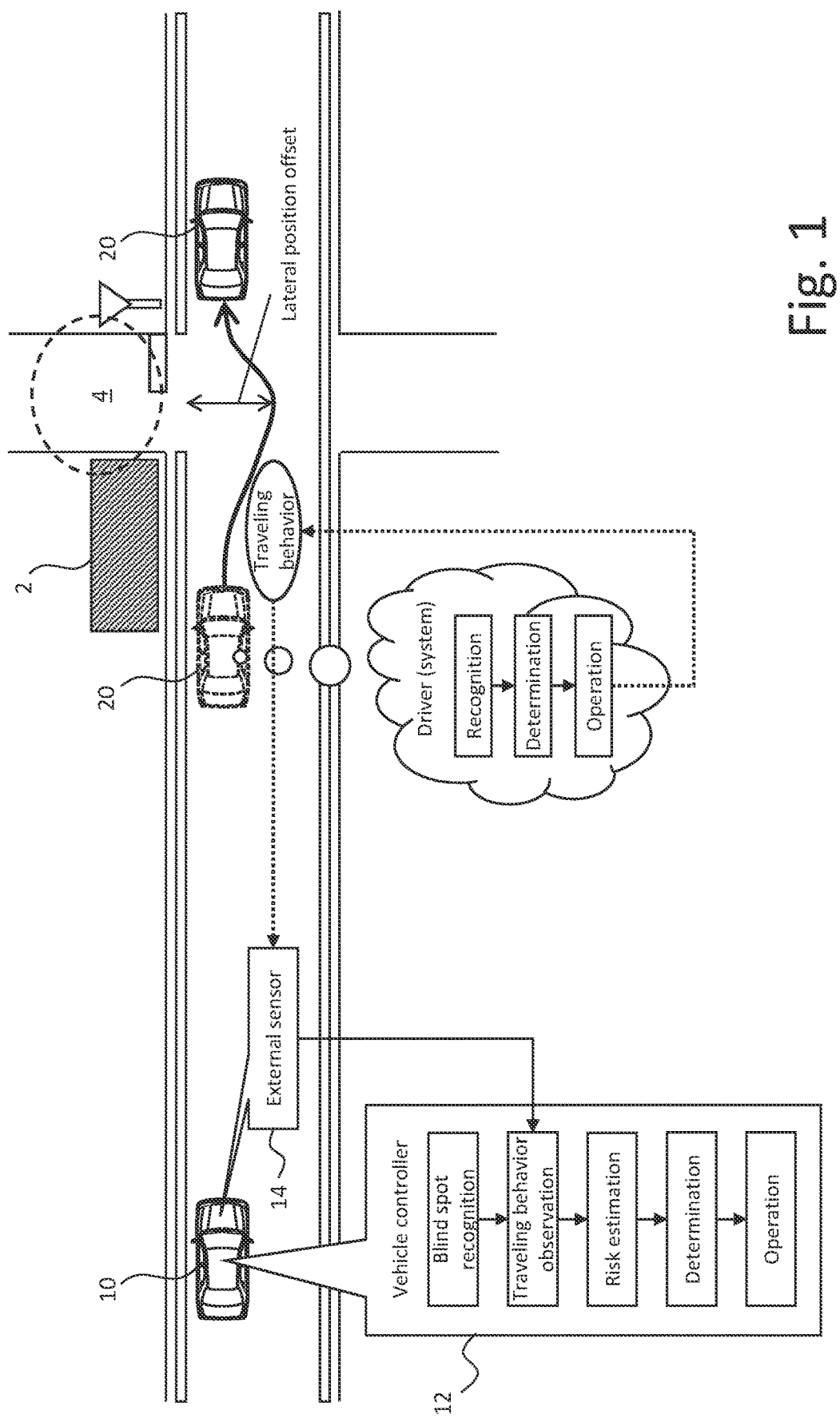
FIG. 1 is a diagram illustrating a vehicle control method according to an embodiment of the present disclosure.

Hereinafter, embodiments of the present disclosure will be described with reference to the drawings.
1. Vehicle Control Method FIG. 1 is a diagram illustrating a vehicle control method according to the present embodiment. The vehicle control method according to the present embodiment is implemented by the vehicle controller 12 mounted on the vehicle 10. Hereinafter, the vehicle 10 on which the vehicle controller 12 is mounted is referred to as an ego-vehicle.

In the example shown in FIG. 1, there is an intersection without a traffic signal ahead of the ego-vehicle 10. When the lane in which the ego-vehicle 10 is traveling is prioritized over the intersecting lane, the ego-vehicle 10 passes through the intersection without stopping. However, an obstacle 2 exists on the left side in front of the intersection when viewed from the ego-vehicle 10, that is, on the lane side where the ego-vehicle 10 is traveling. The obstacle 2 is an entity that blocks the view from the ego-vehicle 10. For example, a building, a fence, a parked large-sized vehicle, or the like can be the obstacle 2. The obstacle 2 creates a blind spot 4 that cannot be seen from the ego-vehicle 10. When a moving object is hidden in the blind spot 4, the moving object may jump into the lane in which the ego-vehicle 10 is traveling. The moving object includes all objects that may jump out of a blind spot, such as a pedestrian, a bicycle, a motorcycle, and an automobile.

The ego-vehicle 10 includes an external sensor 14 for recognizing an external environment. The external sensor 14 is a sensor that acquires information related to a surrounding environment of the ego-vehicle 10 including at least a region in front of the ego-vehicle 10. The external sensor 14 includes at least one of a camera, a millimeter wave radar, and a laser imaging detection and ranging (LiDAR). The information obtained by the external sensor 14 is used for detection of an object present around the ego-vehicle 10, measurement of a relative position and a relative speed of the detected object with respect to the ego-vehicle 10, recognition of a shape of the detected object, and the like. However, a moving object hiding in the blind spot 4 cannot be recognized by the external sensor 14. Thus, the blind spot 4 creates a potential risk for the ego-vehicle 10.

The potential risk to the ego-vehicle 10 is also a risk to the preceding vehicle 20 traveling ahead of the ego-vehicle 10. The preceding vehicle 20 approaches the intersection earlier than the ego-vehicle 10 and passes through the blind spot 4 earlier than the ego-vehicle 10. As the preceding vehicle 20 approaches the intersection, the blind spot 4 viewed from the preceding vehicle 20 becomes narrower. Therefore, when there is a moving object that is about to jump out into the driving lane, the moving object is eventually detected by the driver or the system driving the preceding vehicle 20. When a moving object that is about to jump out into the driving lane can be detected, it is recognized as an explicit risk for the preceding vehicle 20. The driver or the system driving the preceding vehicle 20 operates the preceding vehicle 20 in a mode corresponding to the recognized level of the explicit risk. The operation of the preceding vehicle by the driver or the system appears as a traveling behavior of the preceding vehicle 20.

The vehicle controller 12 recognizes the blind spot 4 existing in front of the ego-vehicle 10 and observes the traveling behavior of the preceding vehicle 20 in the vicinity of the blind spot 4. The traveling behavior of the preceding vehicle 20 reflects the operation of the preceding vehicle 20 by the driver or the system with respect to the risk existing in the vicinity of the blind spot 4. Therefore, the risk caused by the blind spot 4 can be estimated from the traveling behavior of the preceding vehicle 20 in the vicinity of the blind spot 4. Hereinafter, functions of the vehicle controller 12 will be specifically described.

The vehicle controller 12 has a blind spot recognition function. The vehicle controller 12 recognizes the blind spot 4 from the information on the surrounding environment of the ego-vehicle 10. Information for recognizing the blind spot 4 can be obtained from, for example, map information of a navigation system and external environment information acquired by the external sensor 14. From the map information, it is possible to recognize the locations of intersections on the traveling route of the ego-vehicle 10. The presence of the obstacle 2 at the intersection can be recognized from the external information acquired by the external sensor 14.

The vehicle controller 12 has a traveling behavior observation function. The vehicle controller 12 observes the traveling behavior of the preceding vehicle 20 in the vicinity of the blind spot 4 from the information acquired by the external sensor 14. The observed traveling behavior is typically a passing speed at which the preceding vehicle 20 passes near the blind spot 4 and a lateral position offset of the preceding vehicle 20 near the blind spot 4. The transit speed is an absolute speed. The lateral position offset is defined as, for example, a distance from a roadway outer line of a lane in which the ego-vehicle 10 is traveling to the preceding vehicle 20.

The vehicle controller 12 has a risk estimation function. The vehicle controller 12 estimates the risk caused by the blind spot from the traveling behavior of the preceding vehicle 20 in the vicinity of the blind spot 4. A specific method of risk estimation by the vehicle controller device 12 will be described later.

The vehicle controller 12 has a determination function. The vehicle controller 12 determines whether or not to operate the ego-vehicle 10 for risk avoidance from the estimated level of the risk. Furthermore, when the operation of the ego-vehicle 10 for risk avoidance is performed, the vehicle controller 12 determines what mode of operation is performed in accordance with the level of the risk. Examples of the operation for avoiding the risk include increasing the lateral position offset when the moving object enters the intersection in preparation for the moving object jumping out from the blind spot 4, reducing the passing speed when the moving object passes through the intersection, and a combination thereof. The vehicle controller 12 determines to increase the lateral position offset as the estimated risk increases. The vehicle controller 12 determines to lower the passing speed as the estimated risk is higher.

The vehicle controller 12 has an operation function. The vehicle controller 12 operates an actuator that controls the motion of the ego-vehicle 10 on the basis of the determination content regarding the risk avoidance operation. The operated actuators include steering actuators, braking actuators, and drive actuators. For example, when the lateral position offset is increased, the vehicle controller 12 operates the steering actuator to steer the ego-vehicle 10. To reduce the passing speed, the vehicle controller 12 operates the brake actuator to apply a braking force to the ego-vehicle 10, or operates the drive actuator to reduce the driving force applied to the ego-vehicle 10.

The vehicle controller 12 having the above-described functions may constitute an automatic driving system that automatically drives the vehicle. That is, the ego-vehicle 10 may be an autonomous driving vehicle. The vehicle controller 12 may constitute a driver assistance system that supports driving of the vehicle by the driver.

The vehicle controller 12 as hardware is an in-vehicle computer represented by an electronic control unit (ECU). The vehicle controller 12 includes a processor and a program memory coupled to the processor. The processor may be, for example, a central processing unit (CPU), a field-programmable gate array (FPGA), an application-specific integrated circuit (ASIC), or any other processing unit. The processor may be a combination of two or more of a CPU, an FPGA, an ASIC, or other processing unit. The program memory stores a vehicle control program including a plurality of executable instructions. The vehicle control program is a program for causing the processor to execute the above-described functions. The vehicle control program may be recorded in a non-transitory computer-readable storage medium.

The above-described function of the vehicle controller 12 is also effective in avoiding a risk of collision with a moving object coming out from an oncoming lane opposite to the lane in which the ego-vehicle 10 is traveling.

Figure 2:
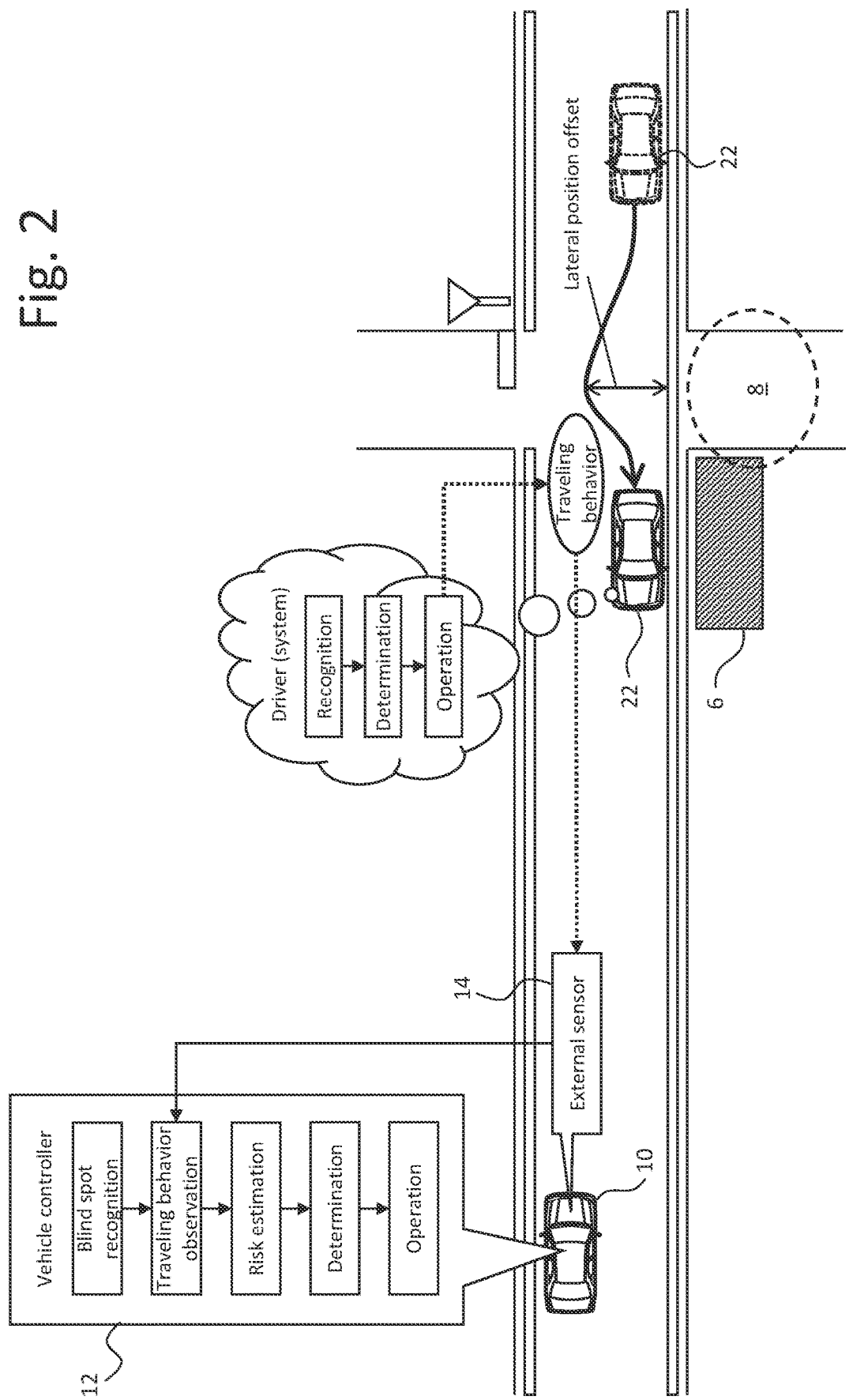
FIG. 2 is a diagram illustrating the vehicle control method according to the embodiment of the present disclosure.

In the example shown in FIG. 2, there is an intersection without a traffic signal ahead of the ego-vehicle 10. The obstacle 6 is present on the right side before the intersection when viewed from the ego-vehicle 10, that is, on the opposite lane side. The obstacle 6 creates a blind spot 8 that cannot be seen from the ego-vehicle 10. When a moving object is hidden in the blind spot 8, the moving object may break through the opposite lane and jump into the lane in which the ego-vehicle 10 is traveling. Therefore, the blind spot 8 on the opposite lane side also causes a potential risk for the ego-vehicle 10.

The potential risk to the ego-vehicle 10 is also a risk to the oncoming vehicle 22 traveling on the opposite lane. The oncoming vehicle 22 passes through the vicinity of the blind spot 8 earlier than the ego-vehicle 10. When there is a moving object that is about to jump out from the blind spot 8 to the opposite lane, the moving object is detected by visual observation of a driver who drives the oncoming vehicle 22 or by a sensor. When a moving object that is about to jump out to the opposite lane can be detected, it is recognized as an explicit risk for the oncoming vehicle 22. The driver or the system driving the oncoming vehicle 22 operates the oncoming vehicle 22 in a mode corresponding to the recognized level of the explicit risk. The actuation of oncoming vehicle 22 by the driver or the system results in a traveling behavior of oncoming vehicle 22.

The vehicle controller 12 recognizes the blind spot 8 existing on the opposite lane side in front of the ego-vehicle 10, and observes the traveling behavior of the oncoming vehicle 22 in the vicinity of the blind spot 8. The observed traveling behavior is typically a passing speed at which the oncoming vehicle 22 passes near the blind spot 8 and a lateral position offset of the oncoming vehicle 22 near the blind spot 8. When the place where the blind spot occurs is on the opposite lane side, the lateral position offset is defined as, for example, a distance from the roadway outside line of the opposite lane to the oncoming vehicle 22. The traveling behavior of the oncoming vehicle 22 reflects an operation of the oncoming vehicle 22 by the driver or the system with respect to a risk existing in the vicinity of the blind spot 8. Therefore, the risk caused by the blind spot 8 can be estimated from the traveling behavior of the oncoming vehicle 22 in the vicinity of the blind spot 8.

2. Risk Estimation Method

Next, a specific method of risk estimation by the vehicle controller 12 will be described.

Figure 3:
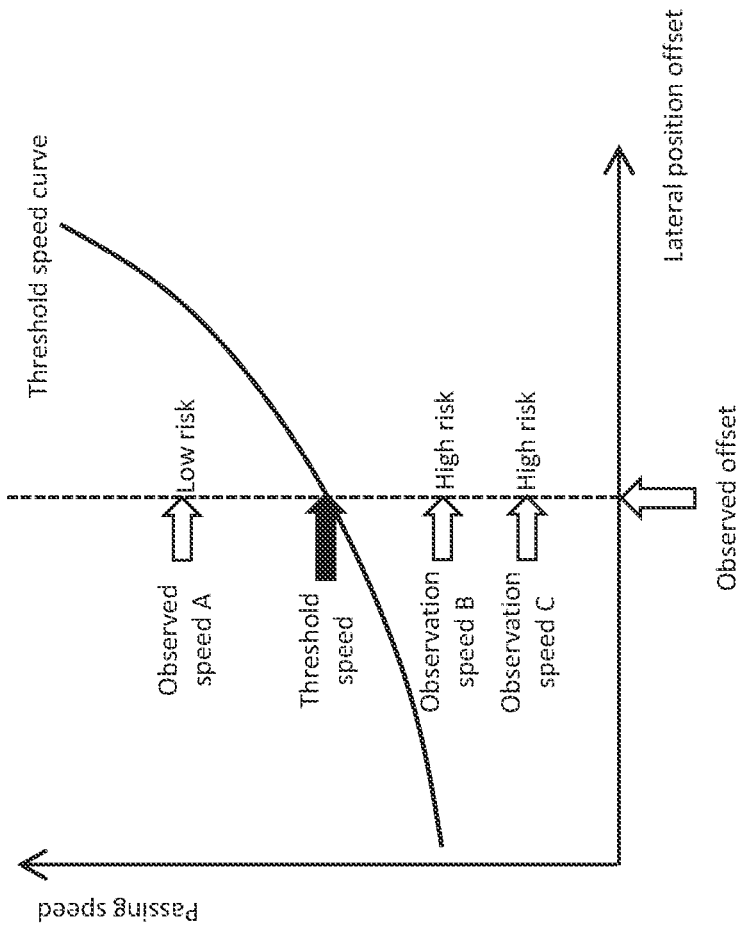
FIG. 3 is a diagram illustrating a method of estimating a risk caused by a blind spot from a behavior of another vehicle.

FIG. 3 is a diagram illustrating a method of estimating a risk caused by a blind spot from a behavior of another vehicle. The horizontal axis of the graph shown in FIG. 3 is the lateral position offset of the blind spot passing vehicle that passes through the blind spot before the ego-vehicle 10. The blind spot passing vehicles include a preceding vehicle (the preceding vehicle 20 in the example shown in FIG. 1) traveling in front of the ego-vehicle 10 and an oncoming vehicle (the oncoming vehicle 22 in the example shown in FIG. 2) traveling on the opposite lane. The vertical axis of the graph shown in FIG. 3 is the passing speed when the blind spot passing vehicle passes through the blind spot.

A curve in the graph shown in FIG. 3 is a boundary line for determining whether or not the risk caused by a blind spot is within an allowable range. The risk is determined by the relationship between the lateral position offset and the passing speed. More specifically, a threshold speed for determining whether the risk is within an allowable range is determined for each lateral position offset. The threshold speed is a passing speed at which a collision between the moving object and the passing vehicle can be avoided even if the moving object jumps out of the blind spot. The threshold speed can be represented by a function using the road width, the shoulder width, the presence or absence of a traffic signal, the presence or absence of a crosswalk, and the like as parameters. The boundary line is a threshold speed curve that defines the threshold speed for each lateral position offset.

The vehicle controller 12 calculates a speed at an intersection between the observed lateral position offset and the threshold speed curve as a threshold speed. Next, the vehicle controller 12 compares the observed passing speed with the threshold speed. When the observed passing speed is higher than the threshold speed, the vehicle controller 12 estimates that the risk caused by a blind spot is low. For example, when the observed passing speed is an observed speed A, the risk is estimated to be low. When the risk is estimated to be low, the vehicle controller 12 does not operate the ego-vehicle 10 to avoid the risk. When the estimated risk is low, the risk avoidance operation is not performed, so that it is possible to prevent the driver from feeling unnecessary.

When the observed passing speed is equal to or less than the threshold speed, the vehicle controller 12 determines that the risk caused by a blind spot is high. For example, when the observed passing speed is an observed speed B and an observed speed C, the risk is estimated to be high. Further, if the observed lateral position offset is constant, it can be estimated that the vehicle passing through the blind spot recognizes a higher risk as the passing speed is lower. Therefore, it can be estimated that the risk in the situation where the observed speed C is observed is higher than the risk in the situation where the observed speed B is observed.

As described above, by comparing the threshold speed calculated from the lateral position offset observed by the external sensor 14 of the ego-vehicle 10 with the observed passing speed, it is possible to estimate the level of the risk caused by the blind spot with high probability. This makes it possible to deal with a risk potentially existing ahead of the ego-vehicle 10 without relying on provision of risk information through communication with the outside.

Figure 4:
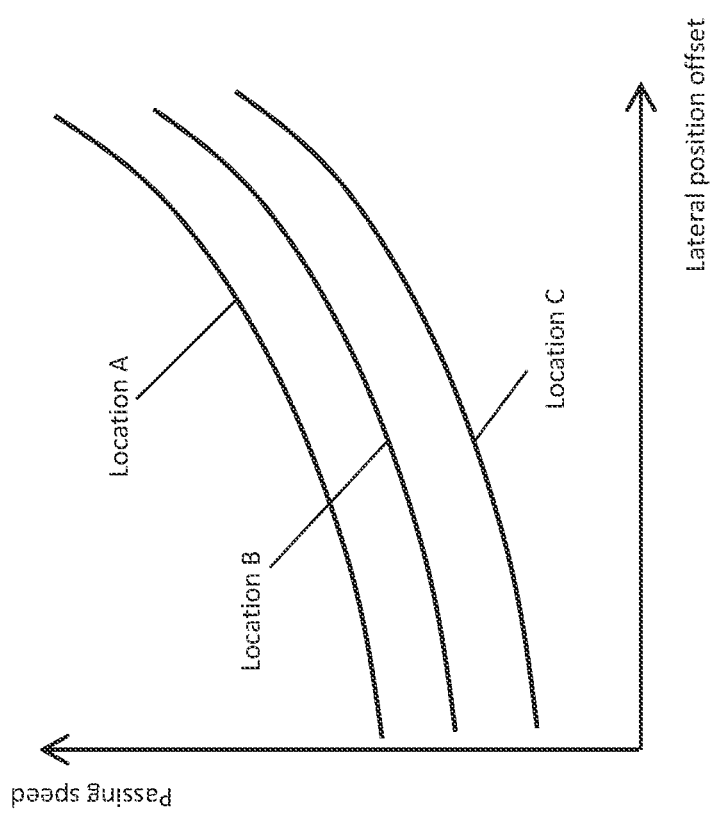
FIG. 4 is a diagram illustrating an example of a threshold speed curve set for each type of moving object that may jump out of the blind spot.

The threshold speed curve is set for each type of moving object that may jump out of the blind spot. FIG. 4 is a diagram illustrating an example of a threshold speed curve set for each type of moving object that may jump out of a blind spot. A moving object A, a moving object B, and a moving object C shown in FIG. 4 are different types of moving objects. For example, between a pedestrian and a bicycle, the bicycle moves faster than the pedestrian. Therefore, assuming that the lateral position offset is constant, the passing speed at which the collision with the moving object jumping out of the blind spot can be avoided is lower when the moving object is a bicycle than when the moving object is a pedestrian. That is, if the type of moving object that may jump out of the blind spot is different, the threshold speed is also different. In the example shown in FIG. 4, the moving object A is the fastest moving object and the moving object C is the slowest moving object.

The type of the moving object that may jump out of the blind spot can be estimated from the type of the moving object detected by the external sensor 14 of the ego-vehicle 10 before reaching the blind spot. For example, if many bicycles are detected before reaching the blind spot, it may be estimated that the moving object that may jump out of the blind spot is a bicycle. It is also possible to estimate the type of a moving object that may jump out of the blind spot based on a time zone such as commuting time or commuting time. Furthermore, it is also possible to estimate the type of a moving object that may jump out of the blind spot from the surrounding environment. For example, when the blind spot is on a school road, there is a high possibility that the pedestrian jumps out of the blind spot. In addition, when the intersection road that cannot be seen due to the blind spot is a downhill road, there is a high possibility that the bicycle that has increased the speed will jump out without stopping.

Figure 5:
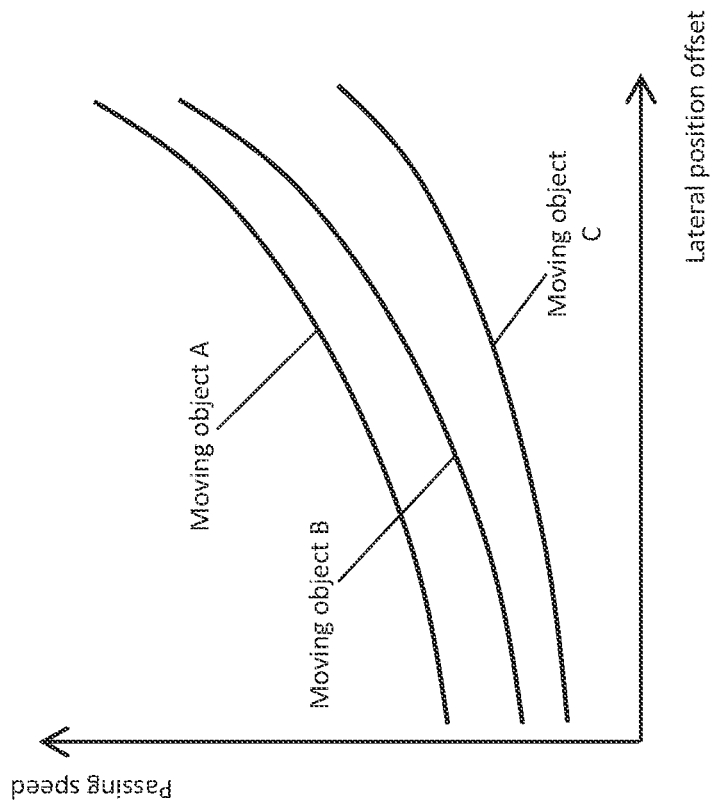
FIG. 5 is a diagram illustrating an example of a threshold speed curve set for each place where the blind spot occurs.

In addition, the threshold speed curve is set for each place where the blind spot occurs. FIG. 5 is a diagram illustrating an example of a threshold speed curve set for each place where a blind spot occurs. Location A, location B, and location C shown in FIG. 5 are different locations. For example, there are an intersection where a pedestrian is likely to jump out and an intersection where a pedestrian is unlikely to jump out in terms of structure. At an intersection where it is difficult for a pedestrian to jump out, the passing speed of the blind spot passing vehicle tends to be high. On a road with a high speed limit, the passing speed of the blind spot passing vehicle is likely to be higher than on a road with a low speed limit. In the example shown in FIG. 5, the location A is a road on which the vehicle is most difficult to speed up, and the location C is a road on which the vehicle is most likely to speed up.

The relationship between the lateral position offset and the threshold speed for each place can be associated with the map information in advance. Observation data acquired by the ego-vehicle 10 for each location by the external sensor 14 can also be used. For example, when the ego-vehicle 10 passes through the place A, the passing speed and the lateral position offset of the surrounding blind spot passing vehicles may be observed, and the threshold speed curve at the place A may be created based on data obtained by the observation. Then, the data of the threshold speed curve at the location A may be updated by comparing the presence or absence of the risk estimated from the data obtained by the observation at the location A with the presence or absence of the actual risk determined when the ego-vehicle 10 passes through the location A.

As described above, the threshold speed curve is set for each place where the blind spot occurs and for each type of moving object that may jump out of the blind spot. For example, when there is a possibility that the moving object A and the moving object B jump out at the place A, the threshold speed curve for the moving object A at the place A and the threshold speed curve for the moving object B at the place A are set. Only one type of threshold speed curve is set for a place where the number of types of moving objects that may jump out is limited to one.

Figure 6:
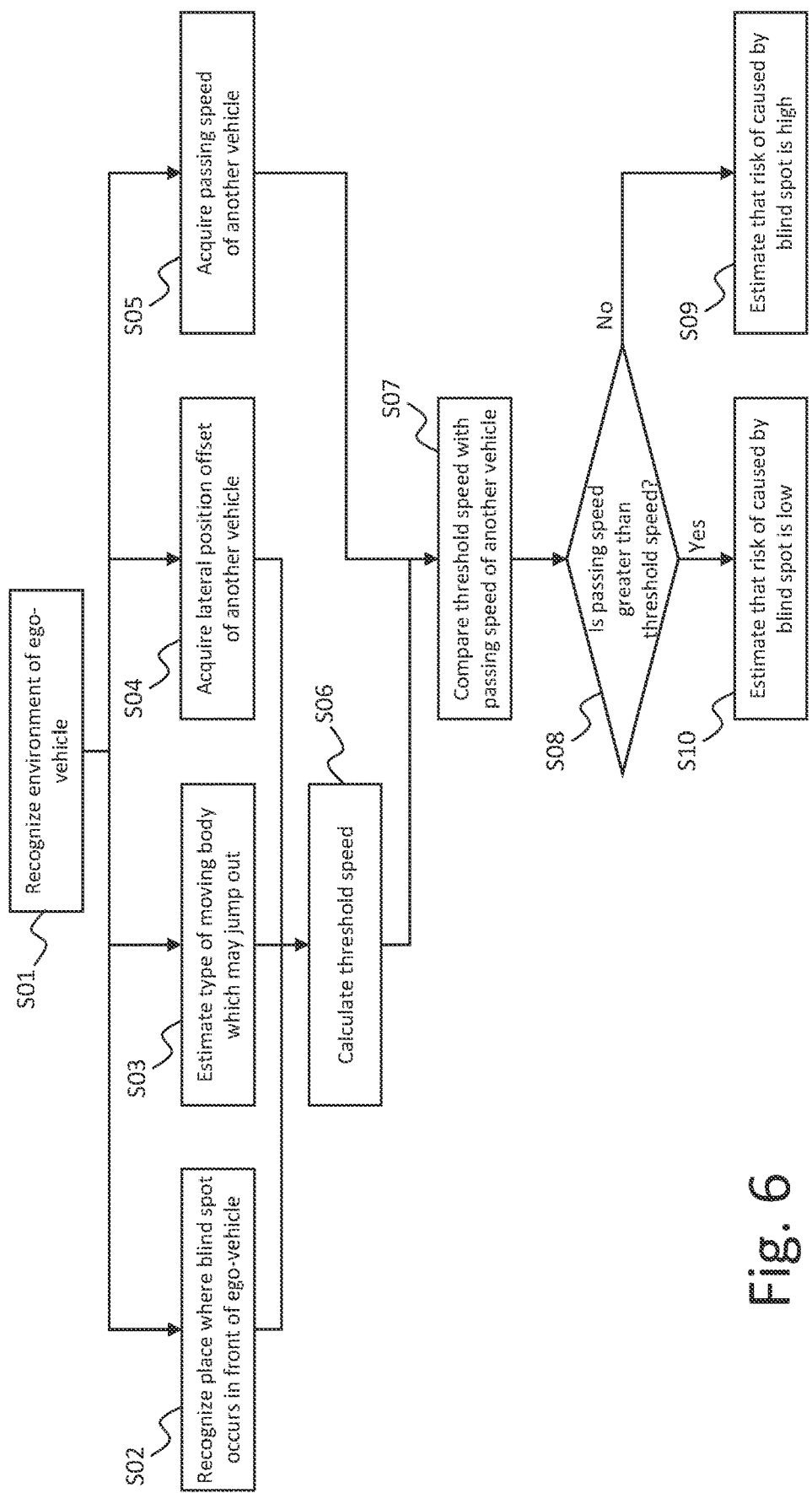
FIG. 6 is a flowchart illustrating a first example of a procedure of a risk estimation method according to the embodiment of the present disclosure.
Figure 7:
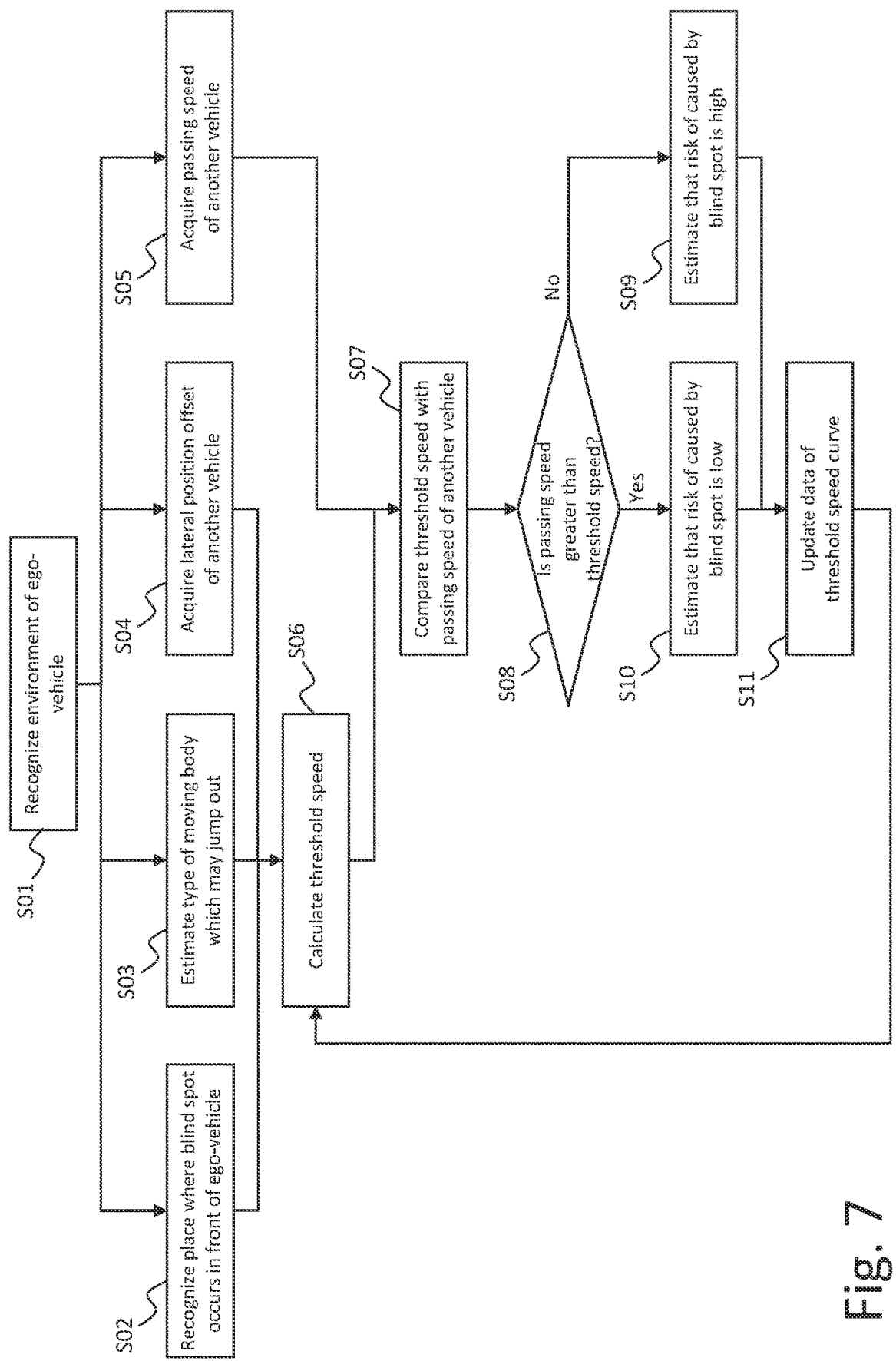
FIG. 7 is a flowchart illustrating a second example of the procedure of the risk estimation method according to the embodiment of the present disclosure.

The vehicle controller 12 performs risk estimation in accordance with the procedure shown in FIG. 6 or FIG. 7. FIG. 6 is a flowchart illustrating a first example of a procedure of a risk estimation method performed by the vehicle controller 12.

In step S01 of the flowchart shown in FIG. 6, external environment recognition of the ego-vehicle 10 is performed by the external sensor 14. The result of the outside recognition performed in step S01 is used in steps S02 to S05.

In step S02, a place where a blind spot occurs in front of the ego-vehicle 10 is recognized using the result of the external environment recognition and the map information. In step S03, the type of the moving object that may jump out of the blind spot recognized in step S02 is estimated based on the result of the external environment recognition. In step S04, the lateral position offsets of the other vehicles are acquired. In step S05, the passing speeds of the other vehicles are acquired. The other vehicles in steps S04 and S05 are blind spot passing vehicles passing through the place where the blind spot recognized in step S02 occurs.

In Step S06, the threshold-value speed curve is selected based on the location where the blind spot occurs, which is recognized in Step S02, and the type of the moving object that may jump out of the blind spot, which is estimated in Step S03. In the first example, the threshold speed curve is fixed for each location where a blind spot occurs and for each type of moving object that may jump out of the blind spot. Then, the threshold speed is calculated by applying the lateral position offset of the blind spot passing vehicles acquired in step S04 to the threshold speed curve.

In step S07, the threshold-value speed obtained in step S06 is compared with the passing speed of the blind spot passing vehicles obtained in step S05. Then, in step S08, it is determined whether or not the passing speed of the blind spot passing vehicles is greater than the threshold-value speed.

As a result of the determination in step S08, if the passing speed of the blind spot passing vehicles is higher than the threshold-value speed, it is estimated that the risk of causing the blind spot is low in step S10. On the other hand, if the passing speed of the blind spot passing vehicles is equal to or less than the threshold-value speed, it is estimated that the risk of occurrence of the blind spot is high in step S09.

FIG. 7 is a flowchart illustrating a second example of the procedure of the risk estimation method performed by the vehicle controller 12. In the flowchart shown in FIG. 7, processes common to those in the flowchart shown in FIG. 6 are denoted by common step numbers. Description of processing common to the flowchart shown in FIG. 6 will be omitted.

In a second example, when it is estimated that the risk caused by a blind spot is low, step S11 is executed. In step S11, the threshold-speed curve is updated based on the risk estimation result obtained in step S09 or S10. Specifically, the estimation result of the risk in step S09 or S10 is collated with the presence or absence of the actual risk that is found when the ego-vehicle 10 passes through the blind spot. Then, based on the comparison result, the data of the threshold speed curve is updated.

For example, when the risk is detected when the ego-vehicle 10 passes through the blind spot although the risk is estimated to be low in step S10, the threshold-speed curve is updated so as to increase the threshold-speed. For example, the threshold-speed curve may be updated so that the passing speed of the blind spot passing vehicles acquired in step S05 becomes equal to or lower than the threshold-speed. On the other hand, if no risk is detected when the ego-vehicle 10 passes through the blind spot even though the risk is estimated to be high in step S09, the threshold-speed curve is updated so as to decrease the threshold-speed. For example, the threshold-speed curve may be updated so that the passing speed of the blind spot passing vehicles acquired in step S05 becomes higher than the threshold-speed. Then, in step S06, the threshold-speed curve is used to calculate the threshold-speed.

What is claimed is:

1. A vehicle control method executed by an in-vehicle computer, the method comprising:
    recognizing a blind spot that is present in front of an ego-vehicle and cannot be seen from the ego-vehicle from information on a surrounding environment of the ego-vehicle;
    observing, from information acquired by an external sensor of the ego-vehicle, a traveling behavior of a blind spot passing vehicle in a vicinity of the blind spot, the blind spot passing vehicle being a vehicle that passes through the blind spot before the ego-vehicle, the observing the traveling behavior of the blind spot passing vehicle comprises measuring a passing speed and a lateral position offset of the blind spot passing vehicle in the vicinity of the blind spot;
    estimating a risk caused by the blind spot based on the traveling behavior of the blind spot passing vehicle, the estimating the risk comprises:
        calculating a threshold speed from the lateral position offset, the threshold speed is a passing speed at which a collision between a moving object and the ego-vehicle is avoided when the moving object jumps out of the blind spot, the threshold speed further calculated by a function using a road width, a shoulder width, a presence or absence of a traffic signal, and the presence or absence of a crosswalk; and
        estimating that the risk is low when the passing speed is higher than the threshold speed, and the risk is high when the passing speed is equal to or lower than the threshold speed; and
    operating the ego-vehicle in a mode corresponding to the risk such that when the observed passing speed is higher than the threshold speed, the vehicle estimated risk caused by the blind spot is low, a risk avoidance operation is not performed.

2. The vehicle control method according to claim 1, wherein the estimating the risk comprises:
    estimating a type of the moving object that is likely to jump out of the blind spot from the information on the surrounding environment; and
    changing the calculation of the threshold speed depending on the type of the moving object.

3. A vehicle controller comprising:
    a program memory storing a plurality of executable instructions; and
    a processor coupled to the program memory,
    wherein the plurality of executable instructions is configured to cause the processor to execute:
        recognizing a blind spot that is present in front of an ego-vehicle and cannot be seen from the ego-vehicle from information on a surrounding environment of the ego-vehicle;
        observing, from information acquired by an external sensor of the ego-vehicle, a traveling behavior of a blind spot passing vehicle in a vicinity of the blind spot, the blind spot passing vehicle being a vehicle that passes through the blind spot before the ego-vehicle, the observing the traveling behavior of the blind spot passing vehicle comprises measuring a passing speed and a lateral position offset of the blind spot passing vehicle in the vicinity of the blind spot;
        estimating a risk caused by the blind spot based on the traveling behavior of the blind spot passing vehicle, the estimating the risk comprises:
            calculating a threshold speed from the lateral position offset, the threshold speed is a passing speed at which a collision between a moving object and the ego-vehicle is avoided when the moving object jumps out of the blind spot, the threshold speed further calculated by a function using a road width, a shoulder width, a presence or absence of a traffic signal, and a presence or absence of a crosswalk; and
            estimating that the risk is low when the passing speed is higher than the threshold speed, and the risk is high when the passing speed is equal to or lower than the threshold speed; and
        operating the ego-vehicle in a mode corresponding to the risk such that when the observed passing speed is higher than the threshold speed, the vehicle estimated risk caused by the blind spot is low, a risk avoidance operation is not performed.

4. A non-transitory computer-readable storage medium storing a vehicle control program comprising a plurality of executable instructions configured to cause an in-vehicle computer to execute:
    recognizing a blind spot that is present in front of an ego-vehicle and cannot be seen from the ego-vehicle from information on a surrounding environment of the ego-vehicle;
    observing, from information acquired by an external sensor of the ego-vehicle, a traveling behavior of a blind spot passing vehicle in a vicinity of the blind spot, the blind spot passing vehicle being a vehicle that passes through the blind spot before the ego-vehicle, the observing the traveling behavior of the blind spot passing vehicle comprises measuring a passing speed and a lateral position offset of the blind spot passing vehicle in the vicinity of the blind spot;

estimating a risk caused by the blind spot based on the traveling behavior of the blind spot passing vehicle, the estimating the risk comprises:

calculating a threshold speed from the lateral position offset, the threshold speed is a passing speed at which a collision between a moving object and the ego-vehicle is avoided when the moving object jumps out of the blind spot, the threshold speed further calculated by a function using a road width, a shoulder width, a presence or absence of a traffic signal, and a presence or absence of a crosswalk; and estimating that the risk is low when the passing speed is higher than the threshold speed, and the risk is high when the passing speed is equal to or lower than the threshold speed; and operating the ego-vehicle in a mode corresponding to the risk such that when the observed passing speed is higher than the threshold speed, the vehicle estimated risk caused by the blind spot is low, a risk avoidance operation is not performed.

\* \* \* \* \*